US006627723B2

(12) United States Patent
Karandinos et al.

(10) Patent No.: US 6,627,723 B2
(45) Date of Patent: Sep. 30, 2003

(54) ADHESIVE ALPHA-OLEFIN INTER-POLYMERS

(75) Inventors: Anthony G. Karandinos, St. Stevens-Woluwe (BE); David J. Lohse, Bridgewater, NJ (US); Keith A. Nelson, Seabrook, TX (US); Jean M. Tancrede, Baton Rouge, LA (US); Bruce Allan Harrington, Houston, TX (US); Olivier J. F. Georjon, Brussels (BE); Kenneth Lewtas, Tervuren (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 233 days.

(21) Appl. No.: 09/746,332

(22) Filed: Dec. 21, 2000

(65) Prior Publication Data

US 2002/0007033 A1 Jan. 17, 2002

Related U.S. Application Data

(60) Provisional application No. 60/199,093, filed on Apr. 21, 2000, and provisional application No. 60/171,715, filed on Dec. 22, 1999.

(51) Int. Cl.[7] ........................... C08F 210/16; C08F 4/64
(52) U.S. Cl. ....................... 526/348; 526/160; 526/165
(58) Field of Search .............................. 526/348, 160, 526/165

(56) References Cited

U.S. PATENT DOCUMENTS

| | | | |
|---|---|---|---|
| 3,954,697 | A | 5/1976 | McConnell et al. |
| 4,178,272 | A | 12/1979 | Meyer, Jr. et al. |
| 4,217,428 | A | 8/1980 | McConnell et al. |
| 5,001,205 | A | 3/1991 | Hoel |
| 5,017,714 | A | 5/1991 | Welborn, Jr. |
| 5,153,157 | A | 10/1992 | Hlatky et al. |
| 5,241,025 | A | 8/1993 | Hlatky et al. |
| 5,317,070 | A | 5/1994 | Brant et al. |
| 5,318,935 | A | 6/1994 | Canich et al. |
| 5,324,800 | A | 6/1994 | Welborn, Jr. et al. |
| 5,478,891 | A | 12/1995 | Lakshmanan et al. |
| 5,502,124 | A | 3/1996 | Crowther et al. |
| 5,504,049 | A | 4/1996 | Crowther et al. |
| 5,723,546 | A | 3/1998 | Sustic |

FOREIGN PATENT DOCUMENTS

| | | |
|---|---|---|
| DE | 199 44 225 A | 3/2000 |
| EP | 0 277 003 A | 8/1988 |
| EP | 0 277 004 A | 8/1988 |
| EP | 0 442 045 A | 8/1991 |
| EP | 0 318 049 B | 4/1992 |
| EP | 0 422 498 B | 2/1996 |
| EP | 0 716 121 A | 6/1996 |
| EP | 0 620 257 B | 9/1997 |
| EP | 0 591 756 B | 11/1998 |
| EP | 0 858 489 B | 12/2000 |
| JP | 62-119212 | 5/1987 |
| JP | 62-119213 | 5/1987 |
| WO | 91/09882 | 7/1991 |
| WO | 93/14132 | 7/1993 |
| WO | 94/03506 | 2/1994 |
| WO | 94/04625 | 3/1994 |
| WO | 94/10256 | 5/1994 |
| WO | 95/07941 | 3/1995 |
| WO | 96/23010 | 8/1996 |
| WO | 96/33227 | 10/1996 |
| WO | 96/40805 | 12/1996 |
| WO | 97/15636 | 5/1997 |
| WO | 97/22639 | 6/1997 |
| WO | 97/47835 | 12/1997 |
| WO | 98/03603 | 1/1998 |
| WO | 98/23699 | 6/1998 |
| WO | 98/42780 | 10/1998 |
| WO | 99/09306 | 2/1999 |
| WO | 99/20644 | 4/1999 |
| WO | 99/24516 | 5/1999 |
| WO | 99/67307 | 12/1999 |

OTHER PUBLICATIONS

John D. Scollard et al., *Organometallics* 1995, v. 14, pp. 5478–5480—"Sterically Demanding Diamide Ligands . . . ".
Scollard et al., *Macromolecules*, 1996, v. 29—pp. 5241–5243—"Polymerization of α–Olefins by Chelating Diamide Complexes of Titanium".
George J.P. Britovsek et al., *Chem. Commun.*, 1998, pp. 849–851—"Novel Olefin Polymerization Catalysts Based on Iron and Cobalt".
"Liquid Chromatography of Polymers and Related Materials III", J. Cazes, Ed., Marcel Dekker, 1981,—pp. 207–235.
Mun Fu Tse, *Journal of Adhesion Science and Technology*, 1989, v. 3(7), pp. 551–570 "Studies of Triblock Copolymer–tackifying Resin Interactions by Viscoelasticity . . . ".
Creanova, "Klebrohstoffe für Hot–melt Anwendungen—Vestoplast", *Degussa–Huls*, Marl XP002176337, pp. 3–13; figs. 3–5, table 1—pp.20, Aug. 1996.

*Primary Examiner*—Caixia Lu

(57) ABSTRACT

The invention relates to novel adhesive alpha-olefin inter-polymers which are largely amorphous and have a rheological behavior that makes them suitable for adhesive use, both without and with minimized amounts of tackifying resins. Specifically, the invention poly-alpha olefin inter-polymer may be composed of A) from 60 to 94 mol % of units derived from one alpha mono-olefin having from 3 to 6 carbon atoms and B) from 6 to 40 mol % of units derived from one or more other mono-olefins having from 4 to 10 carbon atoms and at least one carbon atom more than A); and C) optionally from 0 to 10 mol % of units derived from another copolymerizable unsaturated hydrocarbon, different from A) and B); the diad distribution of component A in the polymer as determined by $^{13}C$ NMR as described herein showing a ratio of experimentally determined diad distribution over the calculated Bernoullian diad distribution of less than 1.07; and the storage modulus G' of said polymer, determined upon cooling as described herein, intersecting a value of $3.10^5$ Pa at a temperature of less than 85° C. The invention also describes polymerization processes suitable for the manufacture of these adhesive alpha-olefin inter-polymers.

48 Claims, 4 Drawing Sheets

ADHESIVE ALPHA-OLEFIN INTER-POLYMERS

RELATED APPLICATIONS

The present application is based on Provisional Application Ser. No. 60/199,093, filed on Apr. 21, 2000, and on Provisional Application Ser. No. 60/171,715, filed on Dec. 22, 1999.

FIELD OF INVENTION

Adhesive alpha-olefin inter-polymers, adhesive compositions or formulations comprising such inter-polymers for adhesive application and adhesion processes and articles in which adhesive compositions or formulations are used.

BACKGROUND OF INVENTION

Certain alpha-olefin inter-polymers have been used in adhesive compositions which should yield a significant bond strength after application, show good paper adhesion (e.g. fiber tear on Kraft paper), minimum peel strength of 500 g/cm, low color, low odor, and good thermal stability. For PSA applications, when the substrate is an OPP tape, the rolling ball tack test should yield a maximum of 3 cm at ambient temperature, a S.A.F.T. minimum value of 85° C., a shear (12.5 mm×25 mm area under a 1 Kg weight) on cardboard at 40° C. of at least 30 hours. Most known alpha-olefin inter-polymers in such compositions have a high melting point and/or a high crystallinity. These characteristics prevent such materials, on their own, from being used as an adhesive because an adhesive must a low crystallinity for flexibility and a low plateau modulus, as well as a low viscosity in many applications. (see J. Adhesion Sci. Technol. Vol 3, No 7 pp551–570 (1989) where an SBS block-copolymer is used).

In such prior art adhesive formulations, the alpha-olefin inter-polymers contribute to the bond-strength, but tackifiers are used to increase the Tg for good bond strength and bring the high plateau modulus down to an acceptable level by decreasing the polymer chain entanglements. Flow promoters (waxes etc) are used to improve the flow and ensure wetting of the substrate by the formulation. Without tackifiers and flow promoters, such inter-polymers can be used to heat seal at reduced temperatures but are not, generally, regarded as adhesives.

The inter-polymers are derived predominantly from ethylene or propylene (For ethylene based polymers see WO97-15636-A1; WO99/24516; WO9803603 (EP-912646) by way of example using single site catalyst; WO97-15636-A1 or WO94/10256; U.S. Pat. No. 5,317,070 and WO94/04625, using syndiotactic polypropylene as the polymer component, and mentioning on page 7 line 14 of hexene as comonomer. For propylene based polymers further see EP-318049. For basic monomers other than propylene or ethylene, see for example EP-422498 a butene-propylene inter-polymer with up to 20 wt % propylene derived units).

As an example of the inter-polymers used for heat sealing or impact modification, reference is made to JP62-119212-A2. This discloses a random copolymer with from 40–90 mole % of propylene, from 10–60 mole % of an alpha-olefin such as butene, hexene, and 4-methylpentene using a metallocene type ethylene-bis tetrahydro-indenyl zirconium dichloride as a catalyst. Similarly JP62-119213-A2 discloses a random copolymer of butene (60–98 mole %) with 2–40 mole % of C3–20 alpha-olefin such as propylene, hexene, and 4-methylpentene.

However, the Examples in JP62-119212-A2 have widely varying characteristics. Example 6 polymerizes propylene and hexene to give 60 percent of units derived from propylene and 40 mol % of units derived from hexene. The crystallinity is 26% and the melting point is 123° C. Example 3 uses propylene at 45 mol % with a melting point of 50° C. and a crystallinity 7%. JP62-119212-A2 does not disclose a polymer having a combination of structural characteristics (molecular weight; comonomer content for example) such that a storage modulus G' suitable for adhesive applications is reached below 70° C. or providing a low melting peak. The polymers are said to have anti-blocking characteristics and are of no use in adhesive applications.

WO99/67307 discloses a terpolymer comprising predominantly propylene derived units for use as films, fibers, and molded articles, and also seal layers. The polymers in Table 4 have low comonomer contents, high melting points and high molecular weights.

WO9920644 discloses elastic composition of propylene homopolymers for adhesive application. Metallocenes are used in the polymerization.

In other documents, alpha-olefin inter-polymers are prepared using a conventional Ziegler-Natta catalyst with a titanium chloride transition metal component and an aluminum alkyl activator to give a polymer with a monomer composition in which the amounts of propylene (lower molecular weight comonomer) and higher molecular weight comonomer are approximately equivalent have been suggested for adhesive application. These have been referred to as A(morphous) P(oly) A(lpha) O(lefin), APAO's for short.

U.S. Pat. No. 3,954,697 discloses in example 1 a propylene-hexene-1 copolymer containing 43 mol % of hexene-1 derived units which can be coated onto a tape hot to give a pressure sensitive adhesive material. The polymer may be used without additives (See column 2 lines 34 to 39) and can be applied as a hot melt to a tape without solvent to show PSA behavior. In U.S. Pat. No. 3,954,697, the amount of hexene deemed essential for a polymer is in excess of 40 mol % and the polymer structure must be such that that the polymer is entirely amorphous and has no residual crystallinity (See Column 3 lines 24 to 26) or crystallinity of a very low order (See column 4 line 8). For example, comparative Example 9 uses 18 mol % hexene in the polymer and obtains a melting point of 145° C. suggesting the absence of Theological characteristics or melting points associated with satisfactory adhesive behavior. This polymer lacks tackiness at ambient temperature.

High propylene content APAO with butene comonomer have been made and sold under the Registered trade name Rextac using non-SSC type catalysts. WO98/42780 discusses the use of such polymers in adhesive compositions.

More details on such inter-polymers and their use in adhesive compositions can be found in U.S. Pat. No. 5,478, 891. U.S. Pat. No. 5,723,546 uses blends to obtain the desired characteristics. Details can be derived from U.S. Pat. No. 4,217,428, U.S. Pat. No. 4,178,272 and U.S. Pat. No. 3954697 which recommend generally high amounts of the higher molecular weight alpha-olefin comonomer.

WO9823699 and EP 620257 disclose a polymer in which from 70 to 99 mol % is derived from a C6 to C12 alpha-olefin and the remainder is a lower alpha-olefin. The exemplified combinations are of hexene-propylene and octene-ethylene inter-polymers prepared with a conventional Ziegler-Natta catalyst. A low Tg can be obtained. The material may be cross-linked to improve cohesive strength. Nevertheless there are drawbacks associated with such polymers and their application in adhesive end uses. Such known APAO's are non-homogenous, have significant levels of extractables and unsatisfactory physical properties, including low cohesive strength, that restrict the application and adhesive performance.

SUMMARY OF INVENTION

The invention relates (I) to novel adhesive alpha-olefin inter-polymers which are largely amorphous and have a Theological behavior that makes them suitable for adhesive use. In this aspect, the invention also relates to processes for the manufacture of these adhesive alpha-olefin inter-polymers.

In one aspect the invention provides a polymer which is suitable for adhesive use and has a sufficiently high storage modulus upon cooling, without relying unduly on the presence of lower molecular weight components such as a tackifier (which can create problems of excessive migration of its constituents and requires blending) or low molecular impurities formed in the course of polymerization and/or which has a low melting point with a narrow melting range and/or which has a monomer distribution pattern which provides an improved balance of low melting point and cohesive strength. Therefore in one aspect the invention provides an adhesive composition or formulation which contains no or low amounts of tackifier, yet provides a satisfactory balance of properties for an adhesive composition.

Advantages of the invention include improved polymers which can be used with reduced amounts of, or possibly no tackifier, in order to provide a hot melt adhesive composition or formulation. These polymers can be used with reduced amounts of, or possibly no solvent, in order to provide a adhesive formulations with reduced environmental impact. Further, another embodiment of the invention provides sprayable adhesive formulations, including sprayable HMA compositions, comprising predominantly of polymers having a reduced plateau modulus and/or molecular weight.

In one specific embodiment the invention provides in a first aspect a poly-alpha olefin inter-polymer comprising A) from 60 to 94mol % of units derived from one alpha mono-olefin having from 3 to 6 carbon atoms and B) from 6 to 40 mol % of units derived from one or more other mono-olefins having from 4 to 10 carbon atoms and at least one carbon atom more than A); and C) optionally from 0 to 10 mol % of units derived from another copolymerizable unsaturated hydrocarbon, different from A) and B);

the diad distribution of component A in the polymer as determined by $^{13}C$ NMR as described herein showing a ratio of experimentally determined diad distribution over the calculated Bernoullian diad distribution of less than 1.07; and the storage modulus G' of said polymer, determined upon cooling as described herein, intersecting a value of $3.10^5$ Pa at a temperature of less than 85° C.

In another aspect there is provided a poly-alpha olefin inter-polymer having (I)

A) from 60 to 94mol % of units derived from one alpha mono-olefin having from 3 to 6 carbon atoms and B) from 6 to 40 mol % of units derived from one or more other mono-olefins having from 4 to 10 carbon atoms and at least one carbon atom more than A); and optionally from 0 to 10 mol % of units derived from another copolymerizable unsaturated hydrocarbon, different from A) and B);

the diad distribution of component A in the polymer as determined by $^{13}C$ NMR as described herein showing a ratio of experimentally determined diad distribution over the calculated Bernoullian diad distribution of less than 1.07; and said polymer having a melting behavior as determined by DSC, as described herein, so that $T_m$ (interpolymer) is less than $153-2.78 \times [C_{B+C}]$ for any given concentration of B) and/or C) components where $T_m$ is the major melting peak of the interpolymer at a given content of components B) and C) in mol %; [$C_{B+C}$] is the mol % of component B) plus C).

The invention thus further relates (II) to adhesive compositions which consist predominantly of the inter-polymer and to formulations for adhesive end-uses comprising the inter-polymer and in addition limited amounts of other components such a) tackifiers for lowering the plateau modulus and/or b) flow promoters such as low molecular weight additives for lowering the viscosity of the formulation in its molten state during the application of the formulations onto a substrate. Anti-oxidants, stabilisers etc. may also be present in the composition and formulations.

Such compositions or formulations may be a hot melt adhesive (HMA) and be applied to a substrate in the substantial absence of solvent or diluent at above ambient temperature to initiate adhesion and then cool to ambient temperature to establish a bond.

Such compositions or formulations may be a pressure sensitive adhesive (PSA) and be applied in the substantial absence of solvent or diluent to a substrate to initiate adhesion at ambient temperature. If the PSA is applied hot to its substrate to form an article, for example a tape or label which is subsequently used at ambient temperature to initiate adhesion, the PSA is known as a hot melt pressure sensitive adhesive (HMPSA).

Such compositions or formulations may be applied as a solution in the presence of a suitable solvent for the components, to give a solvent based adhesive (SBA). Such solutions are applied to substrate and the solvent is evaporated. For example, the adhesive layer then acts similarly to the HMPSA and is called a solvent-based pressure sensitive adhesive (SBPSA).

The invention additionally relates (III) to processes using such compositions or formulations as well as articles obtained by such processes. For example the compositions and formulations of the invention can be sprayed, preferably in filamentary form, onto a substrate for use in packaging and for disposable items, such as diapers, and other sanitary articles or can be used for adhesive tape.

DETAILED DESCRIPTION OF THE INVENTION

Figure 1:
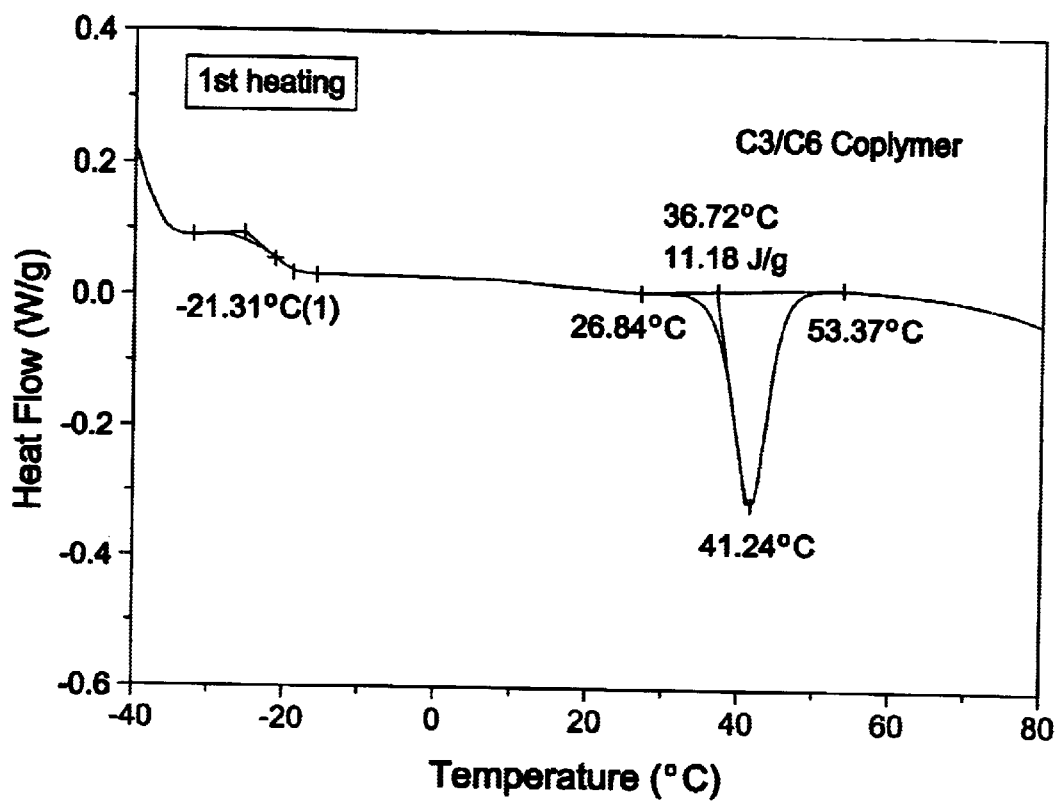
FIG. 1 illustrates the DSC melting behavior as defined herein for a prior art Rextac RT 2715 grade and a inter-polymer according to the invention of Example 1.
Figure 1:
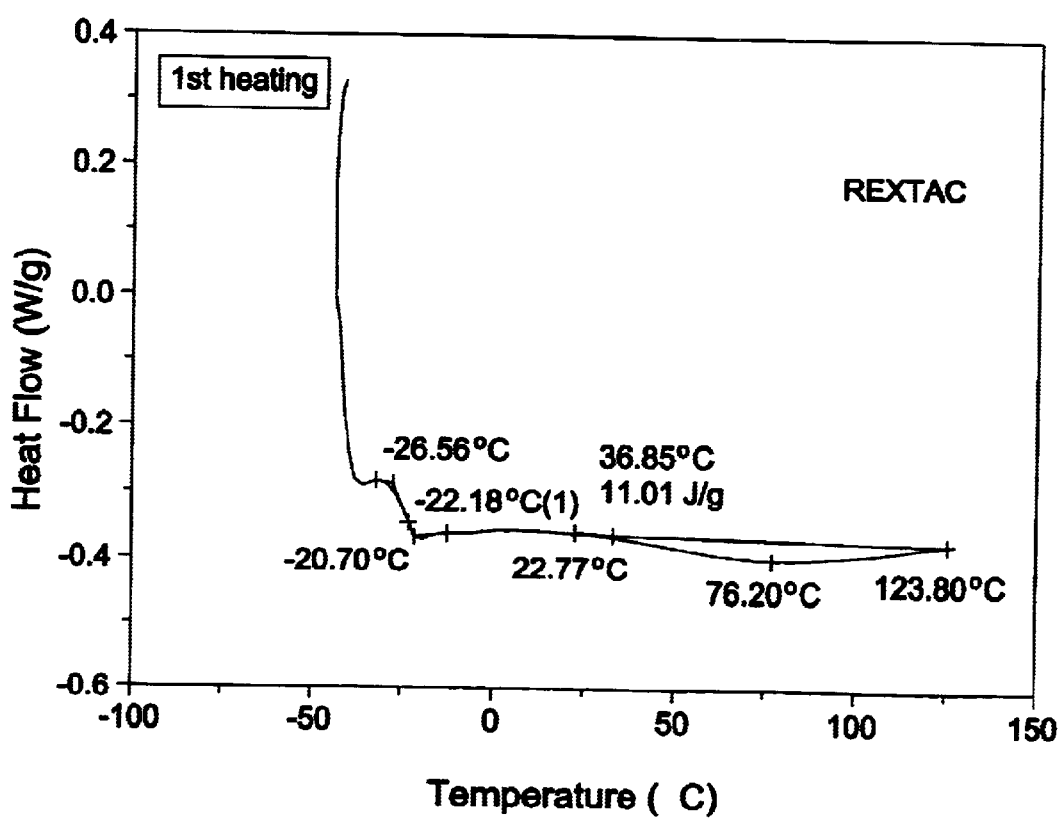
Figure 2:
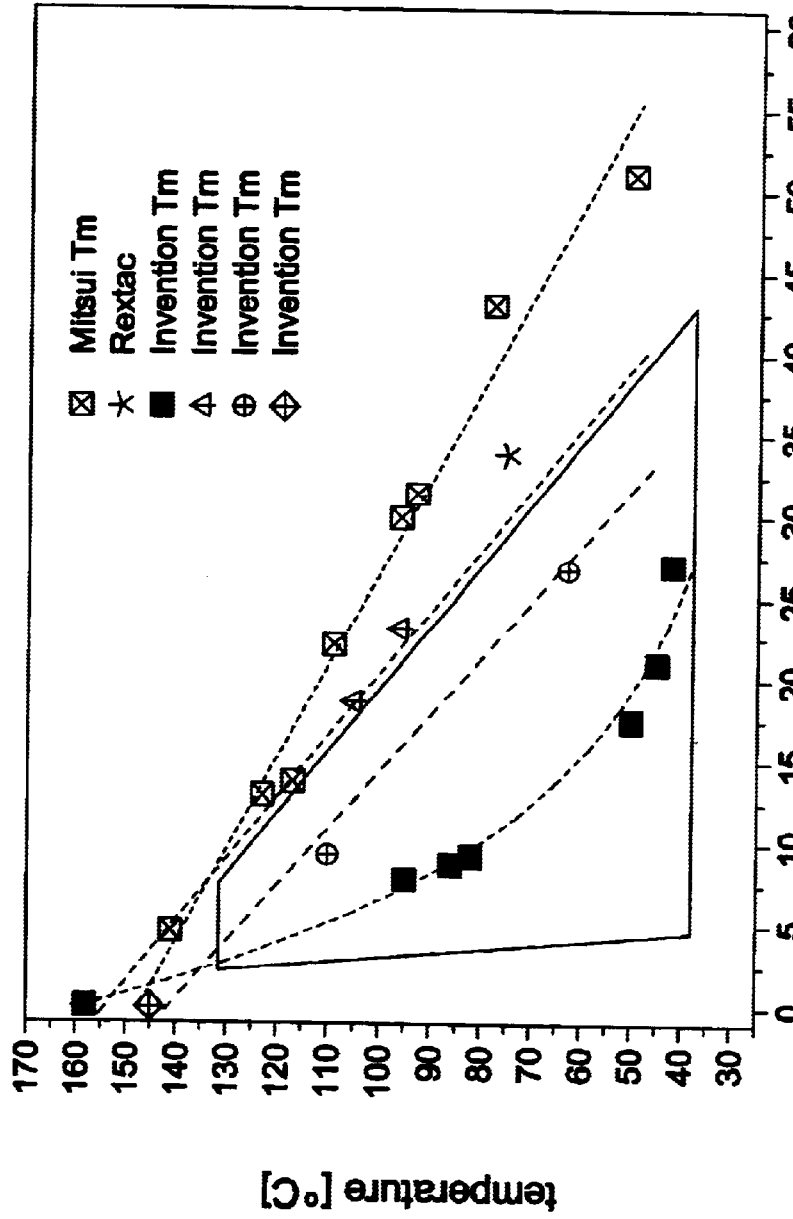
FIG. 2 illustrates the DSC melting peaks against the comonomer content, for Rextac RT 2715, Examples of the invention herein, and Examples of JP62-119212-A2 referred to herein FIG. 3 plots G' versus the temperature during a progressive cooling cycle according to the method described herein for the polymer of Example 1 and Example 3.
Figure 3:
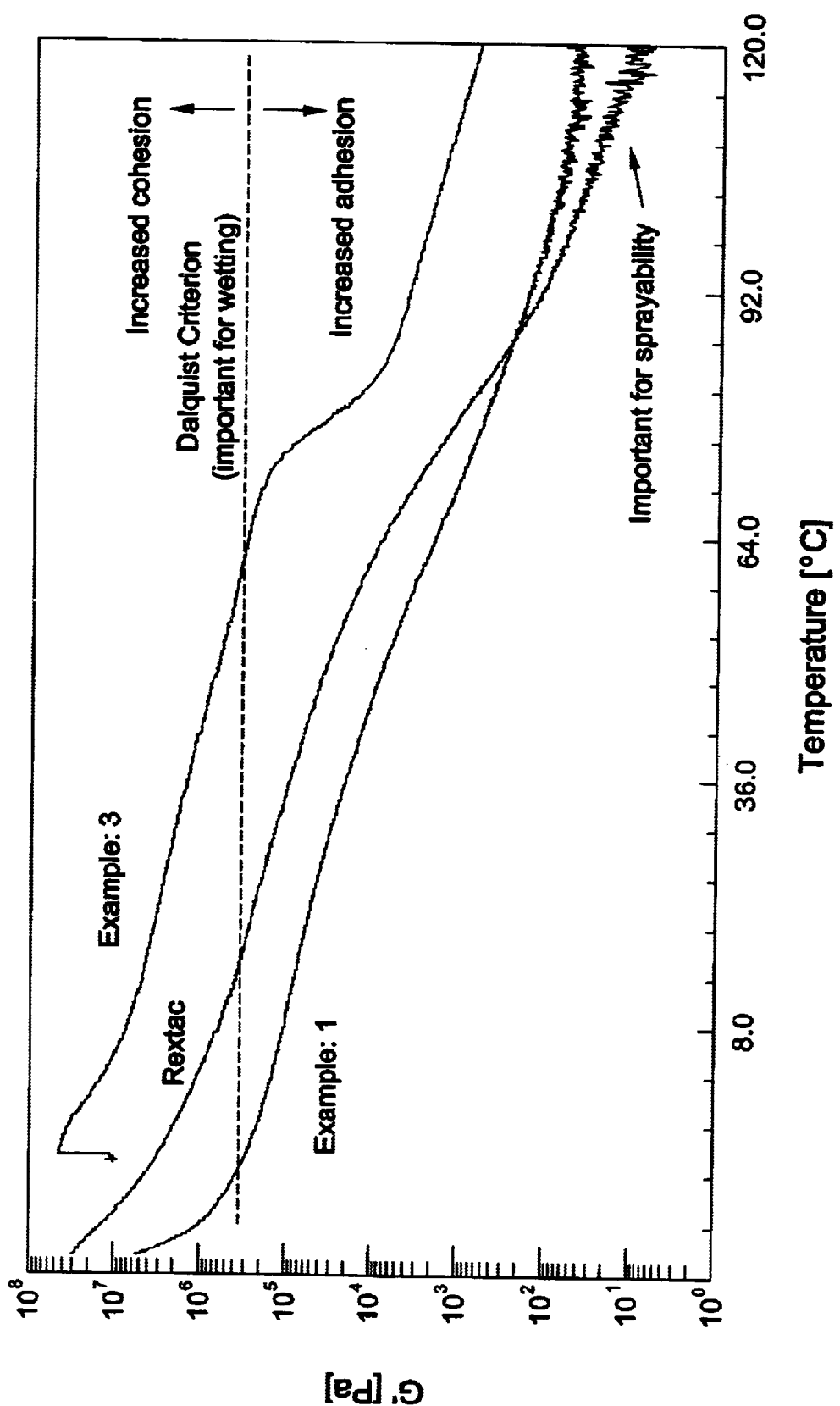
Figure 4:
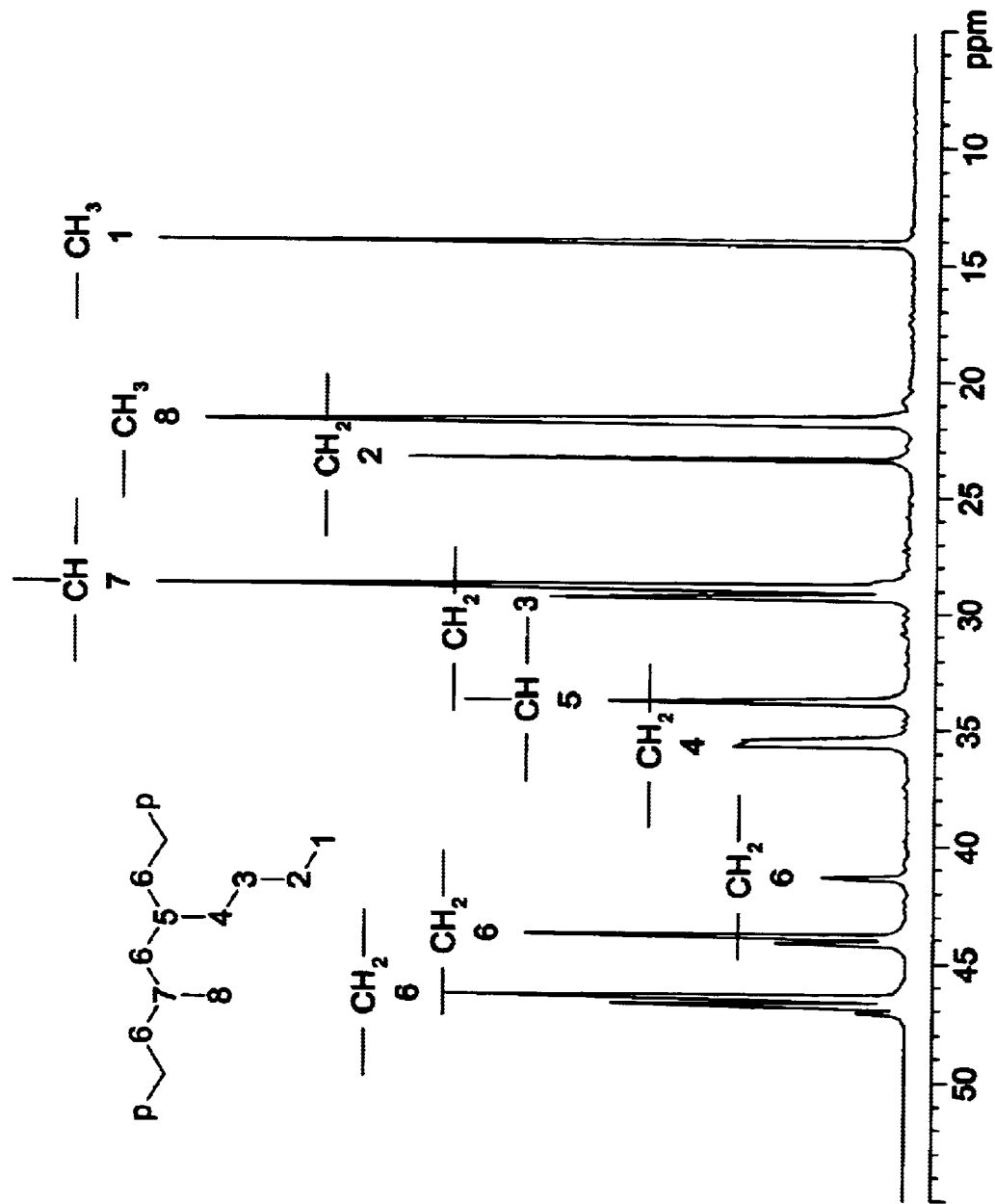
FIG. 4 represent the obtained NMR graph of the polymer of Example 1 and the peak assignment is used to calculate the polymer microstructure for this and other examples.

The selection of the monomer contents for the invention inter-polymers can be combined with the selection of the physical properties to provide a polymer which provides an effective polymeric backbone in an adhesive and requires no or reduced amounts of additional components to achieve the desired balance of processing and adhesive properties. Preferably then A) is derived from units having from 3 to 6 carbon atoms and is most preferably propylene; B) is derived from units having from 4 to 10 carbon atoms, preferably at least one more carbon atoms than A), and is most preferably butene-1, hexene-1 or octene-1, and C) is derived from ethylene.

Preferably the polymer is a random copolymer having a statistically random distribution of component B) and substantially free of blocks of adjacent one or other of the monomer component B) as determined by NMR. The randomness can be provided in continuous processing by a sufficient level of back-mixing in the reactor. In batch processes as used in the examples herein, a sufficient randomness can be provided by ensuring that the finishing monomer composition does not vary excessively from the initial polymer composition. Suitably any batch reaction should be stopped at a relatively low monomer conversion.

These monomers can be readily polymerized using metallocene based catalyst systems to provide low extractability and good adhesive behavior.

Suitably the inter-polymer contains at least 65 mol % (for good crystallinity and bond-strength) and/or no more than 90 mol % of units derived from A) to avoid excessive crystallinity and undesirable stiffness. Advantageously the inter-polymer has a crystallinity of at least 3% and/or no more than 20%, preferably at least 5 mol % and/or no more than 15% as determined by DSC. Suitably the adhesive composition or formulation as applied as an adhesive has a heat of fusion of from 5 to 33 J/g.

The structure and crystallinity of the inter-polymer of the invention also influences the melting point. Preferably the inter-polymer has a major melting peak as determined by DSC of at least 40° C. and/or no more than 130° C., preferably a melting peak of at least 50° C. and/or no more than 90° C. Low levels of crystallinity should provide the inter-polymer with necessary cohesive strength without significant compromise of the adhesive performance while the melting behavior determines its application temperature.

By selecting an inter-polymer with a suitable Tg, one can also reduce or eliminate the need to blend the polymer with a tackifier. Advantageously the inter-polymer has a Tg of at least minus 40° C. and/or no more than minus 5° C., preferably at least minus 30° C. and/or no more than minus 10° C.

The polymer can also be selected by reference to the Theological behavior and preferably has a G' value of less than 0.3 MPa in a temperature window somewhere between the end-use temperature and the processing temperature. With such a low elastic modulus, the adhesive exhibits high deformability during bond formation, and thus can effectively wet the substrate to which it is applied. This is a prerequisite to achieve an adhesive bond of sufficient strength.

The inter-polymer of the invention may have any Mw/Mn value as long as the extractability is low as indicated before. When a metallocene based catalyst system is used, the optimum way of achieving the low extractability is to rely on the narrow Mw/Mn which is advantageously from 1.5 to 4, especially from 1.8 to 3.5.

As a result of the contribution made by the polymer to the adhesive behavior of the adhesive composition or formulation, the composition or formulation may be used without relying on solvent, e.g. substantially free of volatile components, and contain no or less than 25 wt % of tackifier, preferably less than 20 wt %. Alternatively the invention includes formulating the adhesive in a suitable solvent (SBA).

Depending on the location of the tan $\delta$ as determined by rheology measurements, the composition may be applied as a HMA, PSA, or SBA.

For optimum use as HMA to be applied by spreading or coating, preferably the inter-polymer composition or formulation uses an inter-polymer having a Melt Index from 1 to 2000 as determined under ASTM D1238 method, preferably at least 5, and especially a least 10 and preferably no more than 1000, and especially no more than 500.

For optimum use as HMA to be applied by spraying, preferably the inter-polymer composition or formulation uses an inter-polymer having a Melt Index flowability of at least 1000.

While the inter-polymer contributes to the adhesive behavior, nevertheless it may be desirable to complement that by relying on other ingredients in the formulation. Optionally then the composition or formulation may further comprise from 1 to 25 wt % of a tackifier and/or from 1 to 20 wt % of flow improver.

For optimum use as PSA to be applied by coating, preferably the adhesive comprises an inter-polymer having a Melt Index from 1 to 5000 as determined under ASTM D1238 method preferably 20 to 3000, and especially 100 to 2000.

The adhesives containing the inter-polymer may be used in making hygienic articles containing a structure, elements of which are adhered by a composition or formulation as described above.

In one embodiment, the content of (B) combined with (C) is at least 8 mol % and/or less than 40 mol %, and the storage modulus G' determined upon cooling as described herein intersects a storage modulus G' of $3\times10^5$ Pa at a temperature of less than 70° C.

In one embodiment, the interpolymer has a reactivity ratio $R_A \times R_B$ as determined by NMR as described herein, wherein $F_A$ is the reactivity ratio of component (A) over component (B) and $R_B$ is the ratio of component (B) over component (A), of less than 1.4.

In one embodiment, the interpolymer has a weight average molecular weight as determined by GPC as described herein, of less than 120,000, preferably less than 90,000, and most preferably less than 70,000 and/or at least 20,000, preferably at least 30,000 and especially at least 40,000, and the storage modulus G' of the interpolymer, determined upon cooling as described herein, intersects a storage modulus G' of $3\times10^5$ Pa at a temperature of less than 70° C.

In one embodiment, component (A) is derived from units having from 3 to 6 carbon atoms and preferably propylene; (B) is derived from units having from 4 to 8 carbon atoms, preferably at least two more carbon atoms than (A), and is preferably butene-1, hexene-1 or octene-1; and (C) is derived from ethylene.

In one embodmiment, the interpolymer includes at least 65 mol %, preferably at least 75 mol % of units derived from (A) and/or no more than 94 mol %, preferably no more than 90 mol % of (A); at least 6 mol %, preferably at least 10 mol % of (B) and/or no more than 30 mol %, preferably no more than 25 mol % of (B); and/or no more than 5 mol %, most preferably no more than 2 mol % of (C).

In one embodiment, the interpolymer has a heat of fusion of at least 5 J/g, preferably at least 10 J/g and/or no more than 40 J/g, preferably no more than 30 J/g, and most preferably no more than 20 J/g as determined by DSC as described herein.

In one embodiment, the interpolymer has a major melting peak as determined by DSC, as described herein, of at least 40° C., preferably of at least 50° C. and/or has a melting point as determined by DSC of no more than 130° C., preferably no more than 90° C.

In one embodiment, the interpolymer has a Tg determined by DSC, as described herein, of no more than minus 5° C., preferably no more than minus 15° C., and/or at least minus 40° C., preferably at least minus 30° C.

In one embodiment, the interpolymer has a G' at 120° C. of not greater than 1000 Pa, preferably not greater than 500 Pa and most preferably no greater than 100 Pa.

In one embodiment, the interpolymer has an Mw/Mn as determined by GPC, as described herein, of from 1.5 to 4, more preferably less than 3, most preferably less than 2.2 and/or at least 1.6.

In one embodiment, the interpolymer has a storage modulus G' determined upon cooling as described herein, intersecting a value of 3×10⁵ Pa at a temperature of less than 85° C.

In one embodiment, the interpolymer has a melting peak as detennined by DSC of at least 40° C., preferably of at least 50° C. and/or has a melting point as determined by DSC of no more than 130° C., preferably no more than 95° C.

In one embodiment, the interpolymer has a Tg determined by DSC of no more than minus 5° C., preferably no more than minus 20° C., and/or at least minus 40° C, preferably at least minus 30° C.

Process of Polymerization

The catalyst selected should generally be suitable for preparing polymers and copolymers from olefinically, vinylically and acetylenically unsaturated monomers.

In its broadest form the invention can be performed with any SSC (single sited) catalyst. These generally contain a transition metal of Groups 3 to 10 of the Periodic Table; and at least one ancillary ligand that remains bonded to the transition metal during polymerization. Preferably the transition metal is used in a reduced cationic state and stabilized by a cocatalyst or activator. Especially preferred are metallocenes of Group 4 of the Periodic table such as titanium, hafnium or zirconium which are used in polymerization in the d⁰ mono-valent cationic state and have one or two ancillary ligands as described in more detail hereafter. The important features of such catalysts for coordination polymerization are the ligand capable of abstraction and that ligand into which the ethylene (olefinic) group can be inserted.

The metallocene can be used with a cocatalyst, which may be alumoxane, preferably methylalumoxane, having an average degree of oligomerization of from 4 to 30 as determined by vapor pressure osmometry. Alumoxane may be modified to provide solubility in linear alkanes but is generally used from a toluene solution. Such solutions may include unreacted trialkylaluminum and the alumoxane concentration is generally indicated by mol Al per liter, which figure includes any trialkyl aluminum which has not reacted to form an oligomer. The alumoxane, when used as cocatalyst, is generally used in molar excess, at a mol ratio of from at least 50 preferably at least 100 and no more than 1000, preferably no more than 500.

The metallocene may be also be used with a cocatalyst which is a non- or weakly coordinated anion (these term non-coordinating anion as used herein includes weakly coordinated anions). The coordination should be sufficiently weak in any event, as evidenced by the progress of polymerization, to permit the insertion of the unsaturated monomer component.) The non-coordinating anion may be supplied and reacted with the metallocene in any of the manners described in the art.

The precursor for the non-coordinating anion may be used with a metallocene supplied in a reduced valency state. The precursor may undergo a redox reaction . The precursor may be an ion pair of which the precursor cation is neutralized and/or eliminated in some manner. The precursor cation may be an ammonium salt as in EP-277003 and EP-277004. The precursor cation may be a triphenylcarbonium derivative.

The non-coordinating anion can be a halogenated, tetra-aryl-substituted Group 10–14 non-carbon, element-based anion, especially those that are have fluorine groups substituted for hydrogen atoms on the aryl groups, or on alkyl substituents on those aryl groups.

The effective Group 10–14 element cocatalyst complexes of the invention are, in a preferable embodiment, derived from an ionic salt, comprising a 4-coordinate Group 10–14 element anionic complex, where A⁻ can be represented as:

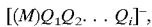
[(M)Q₁Q₂...Q_i]⁻, where M is one or more Group 10–14 metalloid or metal, preferably boron or aluminum, and either each Q is ligand effective for providing electronic or steric effects rendering [(M')Q₁Q₂ ... Q_n]⁻ suitable as a non-coordinating anion that is understood in the art, or a sufficient number of Q are such that [(M')Q₁Q₂ ... Q_n]⁻ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, napthyl and derivatives thereof.

Representative metallocene compounds can have the formula:

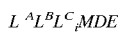
$L^A L^B L^c_i MDE$ where, $L^A$ is a substituted cyclopentadienyl or heterocyclopentadienyl ancillary ligand π-bonded to M; $L^B$ is a member of the class of ancillary ligands defined for $L_A$, or is J, a heteroatom ancillary ligand σ-bonded to M; the $L^A$ and $L^B$ ligands may be covalently bridged together through a Group 14 element linking group; $L^c_i$ is an optional neutral, non-oxidizing ligand having a dative bond to M (i equals 0 to 3); M is a Group 4 or 5 transition metal; and, D and E are independently monoanionic labile ligands, each having a π-bond to M, optionally bridged to each other or $L^A$ or $L^B$. The mono-anionic ligands are displaceable by a suitable activator to permit insertion of a polymerizable monomer or macromonomer can insert for coordination polymerization on the vacant coordination site of the transition metal component.

Non-limiting representative metallocene compounds include mono-cyclopentadienyl compounds such as pentamethylcyclopentadienyltitanium isopropoxide, pentamethyl-cyclopentadienyltribenzyl titanium, dimethyl-silyltetramethyl-cyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclo-pentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl, (tetramethylcyclopentadienyl)(n-propylcyclopentadienyl) zirconium dimethyl; bridged bis-cyclopentadienyl compounds such as dimethylsilylbis(tetrahydroindenyl) zirconium dichloride and silacyclobutyl (tetramethylcyclopentadienyl)(n-propyl-cyclopentadienyl) zirconium dimethyl; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis (2-methylbenzindenyl) zirconium dimethyl; and fluorenyl ligand-containing compounds, e.g., diphenylmethyl (fluorenyl)(cyclopentadienyl)zirconium dimethyl; and the additional mono- and biscyclopentadienyl compounds such as those listed and described in U.S. Pat. Nos. 5,017,714, 5,324,800 and EP-A-0 591 756. All documents are incorporated by reference for purposes of U.S. patent practice.

Preferred metallocenes include bridged chiral bis cyclopentadienyl derivatives which comprise a fused ring system of an indenyl. Suitably these are substituted in the 2-position relative to the bridge. Most preferred are such compounds with no further substitution other than that in the 2 position.

Representative non-metallocene transition metal compounds usable as SSC's also include tetrabenzyl zirconium, tetra bis(trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride.

Additional organometallic transition metal compounds suitable as olefin polymerization catalysts in accordance with the invention will be any of those Group 3–10 that can be converted by ligand abstraction into a catalytically active cation and stabilized in that active electronic state by a noncoordinating or weakly coordinating anion sufficiently labile to be displaced by an olefinically unsaturated monomer such as ethylene.

Exemplary SSC compounds include those described in the patent literature. U.S. Pat. No. 5,318,935 describes bridged and unbridged bisamido transition metal catalyst compounds of Group 4 metals capable of insertion polymerization of α-olefins. International patent publications WO 96/23010, WO 97/48735 and Gibson, et. al., Chem. Comm., pp. 849–850 (1998), disclose diimine-based ligands for Group 8–10 metal compounds shown to be suitable for ionic activation and olefin polymerization. See also WO 97/48735. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. See also the Group 5 organometallic catalyst compounds of U.S. Pat. No. 5,851,945 and the tridentate ligand containing Group 5–10 organometallic catalyst compounds of copending U.S. application Ser. No. 09/302243, filed Apr. 29, 1999, and its equivalent PCT/US99/09306. Bridged bis(arylamido) Group 4 compounds for olefin polymerization are described by D. H. McConville, et al, in Organometallics 1995, 14, 5478–5480. Synthesis methods and compound characterization are presented. Further work appearing in D. H. McConville, et al, Macromolecules 1996, 29, 5241–5243, described bridged bis(arylamido) Group 4 compounds that are active catalysts for polymerization of 1-hexene. Additional transition metal compounds suitable in accordance with the invention include those described in WO 96/40805. Cationic Group 3 or Lanthanide metal complexes for coordination polymerization of olefins is disclosed in copending U.S. application Ser. No. 09/408050, filed Sept. 29, 1999, and its equivalent PCT/US99/22690. The precursor metal compounds are stabilized by a monoanionic bidentate ancillary ligand and two monoanionic ligands and are capable of activation with the ionic cocatalysts of the invention. Each of these documents is incorporated by reference for the purposes of U.S. patent practice.

When using the catalysts of the invention, the total catalyst system will generally additionally comprise one or more organometallic compound as scavenger. Such compounds as used in this application are meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, and isobutyl aluminumoxane. Those compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as activator, any excess over the amount needed to activate the catalysts present can act as a poison scavenger compound and additional organometallic compounds may not be necessary. Alumoxanes also may be used in scavenging amounts with other means of activation, e.g., methylalumoxane and triisobutyl-aluminoxane with boron-based activators. The amount of such compounds to be used with catalyst compounds of the inventions is minimized during polymerization reactions to that amount effective to enhance activity (and with that amount necessary for activation of the catalyst compounds if used in a dual role) since excess amounts may act as catalyst poisons.

The catalysts may be used advantageously in homogeneous solution processes. Random polymerization in homogeneous conditions further promotes the homogeneity of the resulting polymer. Generally this involves polymerization in a continuous reactor in which the polymer formed and the starting monomer and catalyst materials supplied, are agitated to reduce or avoid concentration gradients. Suitable processes include are performed above the melting point of the polymers at high pressure at from 10 to 3000 bar in which the monomer acts as diluent or in solution polymerization using an alkane solvent.

Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane is preferred. Generally speaking, the polymerization reaction temperature can vary from 40° C. to 250° C. Preferably the polymerization reaction temperature will be from 60° C. to 220°. The pressure can vary from about 1 mm Hg to 2500 bar, preferably from 0.1 bar to 1600 bar, most preferably from 1.0 to 500 bar.

The process can be carried out in a continuous stirred tank reactor, or more than one operated in series or parallel. These reactors may have or may not have internal cooling and the monomer feed my or may not be refrigerated. See the general disclosure of U.S. Pat. No. 5,001,205 for general process conditions. See also, international application WO 96/33227 and WO 97/22639. All documents are incorporated by reference for US purposes for description of polymerization processes, metallocene selection and useful scavenging compounds.

EXAMPLES

The following Examples are for illustrative purposes only. The Tests and measurements used in the claims and the following examples are performed as follows:

Measuring Method I

Dynamic Theological properties were determined with a RMS800 equipment manufactured by Rheometric Scientific, Piscataway, N.J. In order to better simulate the real-life process where the materials is applied in the molten state and subsequently cooled down, dynamic moduli were recorded when decreasing temperature from 120 C. down to −20 C. The output of the test is therefore the evolution of the storage modulus G', the loss modulus G", as well as the ratio tan δ=G"/G' as a function of temperature. Measurements were made at a constant frequency of 1 Hz, using a 12.5 mm diameter plate-and-plate geometry. In order to perform measurements at sub-ambient temperatures, liquid nitrogen cooling device was used throughout the whole test, which was minimizing at the same time the risk of thermal-oxidative degradation at high temperature. In order to compensate for dimension changes during the experiments (thermal expansion of tools and samples, as well as sample shrinkage during crystallization) the gap between the two plates were automatically adjusted so to keep a slight constant compression force on the sample. Due to the broad range of mechanical behavior investigated (from the molten state down to the glassy region), the magnitude of the deformation applied was also adjusted during the test in order to keep the force level between measurable limits, and remain well within the linear viscoelastic region at all times.

DSC-peak melting point and crystallinity were determined using a procedure that described as follows. A pre-determined amount of sample pressed at approximately 150° C. to 200° C. to form a film. A central piece of the film (preferably 7 to 12 mg) is removed with a punch die and annealed for 120 hours at room temperature. Thereafter, DSC data was obtained (TA Instruments 2920 temperature modulated DSC) by cooling the sample at −50° C. and subsequently heating it at 10° C./min to 150° C. where it stays isothermally for 5 min before a second cooling-heating cycle is applied. Both the first and second cycle thermal events are recorded. The maximum melting peak is recorded as Tm and the area under the endothermic transition is used to calculate the crystallinity percent. The crystallinity percent is calculated using the formula, [area under the curve (Joules/gram)/165 (Joules/gram)]*100.

The NMR methodology was the following. The sample was prepared by dissolving +/−0.5 g of polymer in 2.5 ml of TCB (trichlorobenzene), to which later 0.5 ml of Deuterobenzene was added. The analysis was performed at 300 MHz NMR instrument, at 125 degree C., the acquisition time was 2 sec, delay 38 sec, full decoupling, 1024 transients. The reactivity ratio was determined using the formula 4*PP*HH/(PH+HP)2. Bemouillian behavior implies that there is no influence from the last comonomer unit in the growing chain on the next one coming in, therefore incorporation is only depended on monomer concentration in the feed. A perfectly Bemouillian system would have a product of reactivity ratios of $r_a*r_b=1$. For example, Rextac (a Ziegler-Natta propylene copolymer) has a product reactivity ratios of 1.3, polymer in present invention between $0.9<r_a*r_b<1.1$. Therefore these polymers are much more Bernullian than the Rextac. Polymer Sequence Determination, J. C. Randall, Academic Press 1977.

All molecular weights are weight average molecular weight unless otherwise noted. Molecular weights (weight average molecular weight (Mw) and number average molecular weight (Mn) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III'" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for Mw/Mn which was calculated from elution times. The numerical analyses were performed using Expert Ease software available from Waters Corporation.

Examples of Inter-polymers

The following examples are presented. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. The polymers are prepared on a laboratory scale using batch reactors with stirring. In these examples certain abbreviations are used to facilitate the description. These include standard chemical abbreviations for the elements. Melt Index (MI) values in the description and claims were measured according to ASTM D 1238 condition E at 190° C. with a 2.16 kg. load.

The toluene was further dried over a sodium/potassium alloy. Triethylaluminum was purchased from Akzo Nobel. Elemental Analyses were performed by Galbraith Laboratories, Inc.

Preparation of Polymer

Example 1

300 ml of prepurified and degassed hexane was transferred into a stainless steel autoclave reactor with internal capacity of 1000 ml. The reactor had been maintained under slight positive argon atmosphere at all times. Consequently, 2 ml solution of 10% wt. methylaluminoxane in toluene, supplied by Aldrich, was transferred into the autoclave. 40 ml of prepurified hexene was added and the mixture was stirred until stable pressure was reached. The reactor was maintained at a pressure slightly above atmospheric. In succession, 50 g of prepurified propylene was added under stirring. The reactor mixture was heated to 90° C. At this reactor temperature premixed 2 mg of dimethylsilyl-bis(2-methyl-4-phenylindenyl)zirconium dichloride (1 mg/1 ml of toluene) and 2 ml solution of 10 wt. % methylaluminoxane in toluene were placed in the reactor. The polymerization was conducted for 30 minutes. The product which was soluble in hexane was precipitated twice in acidified isopropanol. Thereafter, the product was filtered and dried under reduced pressure for 24 hr. The yield was 48 g.

The composition as determined by NMR was 73% mole propylene and 27% mole hexene derived units. The molecular weights and molecular weight distribution from GPC were: Mn=46 k, Mw=93 k, Mz=168 k, Mw/Mn=2.04.

The DSC showed Tm=41° C. this melting point was observed only at the first heating (See FIG. 1). This due to the fact that the material crystallizes slowly (depending on the material crystallization can take days or even weeks). The crystallinity during the first heating was 6.7%. The glass transition was minus 23° C.

Example 2

The polymerization was conducted in the same way as in Example 1 except that the supplied monomer proportions were changed. 73 g of product were obtained. From NMR data the composition was 74 mole % propylene and 26 mole % hexene. The DSC data showed Tm=43° C., crystallinity 7% and Tg=−21° C. The molecular weight information were obtained from GPC (Mw=99 k, Mn=44 k, Mz=160 k, Mw/Mn=2.24).

Example 3

500 ml of purified and degassed toluene was transferred into a stainless steel autoclave reactor with internal capacity of 1000 ml. The reactor had been maintained under slightly positive $N_2$ atmosphere at all times. Consequently, 1 ml solution of 10% wt. methylaluminoxane in toluene was transferred into the autoclave. Then, 40 ml of prepurified hexene was added and the mixture was stirred until a stable pressure was reached. The reactor was maintained at a positive pressure (i.e. slightly above atmospheric). In succession, 150 ml of prepurified liquid propylene was added under stirring. The reactor mixture was heated to 95° C. At this reactor temperature premixed 0.5 mg of dimethylsilyl-bis(2-methyl-4-phenylindenyl)zirconium dichloride (1 mg/1 ml of toluene) and 1 ml solution of 10 wt. % methylaluminoxane in toluene were placed in the reactor. The polymerization was conducted for 20 minutes. The product which was soluble in hexane was precipitated in slightly acidified isopropanol. Thereafter, the product was filtered, washed and dried under reduced pressure for 24 hr. The yield was 75.8 g.

The composition was determined by NMR (91.9% mole propylene and 8.1% mole hexene). The molecular weights and molecular weight distribution from GPC data were: Mn=11 k, Mw=25 k, Mw/Mn=2.2.

The DSC showed Tm=95° C. (melting peak), Tc=50° C. The crystallinity was 18%. The glass transition temperature was minus 6° C.

Example 4

The polymerization procedure described in Example 1 was substancially followed conducted in the same way as in except that the supplied monomer proportions were slightly changed, and dimethylsilyl-bis(2-methyl-indenyl)zirconium dichloride (1 mg/1 ml of toluene) was the used catalyst. The product which was soluble in hexane was precipitated in isopropanol. Thereafter, the product was filtered and dried under reduced pressure for 24 hr. The yield was 70 g.

The composition was determined by NMR (79% mole propylene and 21% mole hexene). The molecular weights and molecular weight distribution from GPC data were: Mn=14 k, Mw=28 k, Mz=44 k, Mw/Mn=2.0.

The DSC showed Tm=45° C. this melting point was observed only at the first heating. The crystallinity during the first heating was 10%. The glass transition was −22° C.

Example 5

The polymerization was conducted in the same way as in Example 4 except that 60 ml of hexene was introduced into the autoclave and the reaction temperature was 75° C. Also scavenger, catalyst and cocatalyst supply were cut to half. 54 g of product were obtained. From NMR data the composition was 74 mole % propylene and 26 mole % hexene. The DSC data showed Tm=42° C., crystallinity 11% and Tg=−23° C. The molecular weight information were obtained from GPC (Mw=108 k, Mn=56 k, Mz=171 k, Mw/Mn=1.93).

Example 6

500 ml of purified and degassed toluene was transferred into a stainless steel autoclave reactor with internal capacity of 1000 ml. The reactor had been maintained under slightly positive $N_2$ atmosphere at all times. Consequently, 1 ml solution of 10% wt. methylaluminoxane in toluene was transferred into the autoclave. Then, 60 ml of prepurified hexene was added and the mixture was stirred until a stable pressure was reached. The reactor was maintained at a positive pressure (i.e. slightly above atmospheric). In succession, 100 ml of prepurified liquid propylene was added under stirring. The reactor mixture was heated to 60° C. At this reactor temperature premixed 0.5 mg of dimethylsilyl-bis(2-methyl-4-phenylindenyl)zirconium dichloride (1 mg/1 ml of toluene) and 1 ml solution of 10 wt. % methylaluminoxane in toluene were placed in the reactor. The polymerization was conducted for 20 minutes. The product which was soluble in hexane was precipitated in slightly acidified isopropanol. Thereafter, the product was filtered, washed and dried under reduced pressure for 24 hr. The yield was 68 g.

The composition was determined by NMR (91% mole propylene and 9% mole hexene). The molecular weights and molecular weight distribution from GPC data were: Mn=55 k, Mw=105 k, Mw/Mn=1.9.

The DSC showed Tm=86° C. (melting peak), Tc=25° C. The crystallinity was 15%. The glass transition temperature was minus 8° C.

Example 7

400 ml of purified and degassed hexane was transferred into a stainless steel autoclave reactor with internal capacity of 1000 ml. The reactor had been maintained under slight positive argon atmosphere at all times. Consequently, 1.5 ml solution of 10% wt. methylaluminoxane in toluene was transferred into the autoclave. 15 ml of purified hexene was added and the mixture was stirred until stable pressure. The reactor was maintained at a slightly positive pressure. In succession, 50 g of prepurified propylene was added under stirring. The reactor mixture was heated to 80° C. At this reactor temperature premixed and sufficiently aged, 0.8 ml dimethylsilyl-bis(2-methyl-indenyl)zirconium dichloride (mg/ml of toluene) and 1 ml of 10 wt. % methylaluminoxane in toluene were placed in the reactor. The polymerization was conducted for 10 minutes. Threafter, the reactor was cooled down and vented to the atmosphere. The product, which was soluble in hexane, was precipitated in slightly acidified isopropanol. Thereafter, the product was washed, filtered and dried under reduced pressure for 24 hr. The yield was 20 g.

The composition was determined by NM (93.6% mole propylene/6.4% mole hexene).

The DSC showed melting peak at 94° C., crystallization peak at 48° C. The crystallinity was 18%. The glass transition was −12° C.

Example 8

300 ml of purified and degassed hexane was transferred into a stainless steel autoclave reactor with internal capacity of 1000 ml. The reactor had been maintained under slightly positive argon atmosphere at all times. Consequently, 1.5 ml solution of 10% wt. methylaluminoxane in toluene was transferred into the autoclave. 15 ml of purified octene was added and the mixture was stirred until stable pressure. The reactor was maintained at a slightly positive pressure. In succession, 50 g of prepurified propylene was added under stirring. The reactor mixture was heated to 90° C. At this reactor temperature premixed and sufficiently aged, 0.8 ml dimethylsilyl-bis(2-methyl-indenyl)zirconium dichloride dissolved in 1 ml toluene (1 mg/1 ml) and 1 ml solution of 10 wt. % methylaluminoxane in toluene were placed in the reactor. The polymerization was conducted for 15 minutes. Threafter, the reactor was cooled down and vented to the atmosphere. The product, which was soluble in hexane, was precipitated in slightly acidified isopropanol. Thereafter, the product was washed, filtered and dried under reduced pressure for 24 hr. The yield was 46 g.

The composition was determined by NMR 93.2% mole propylene/6.8% mole octene). The molecular weights and molecular weight distribution from GPC data were: Mn=23 k, Mw=50 k, Mz=91 k, Mw/Mn=2.16.

The DSC showed melting peak at 94° C. The crystallinity was 20%.

Example 9

300 ml of purified and degassed hexane was transferred into a stainless steel autoclave reactor with internal capacity of 1000 ml. The reactor had been maintained under slightly positive argon atmosphere at all times. Consequently, 1.5 ml solution of 10% wt. methylaluminoxane in toluene was transferred into the autoclave. 45 ml of purified 1-butene was added and the mixture was stirred until stable pressure. The reactor was maintained at a slightly positive pressure. In succession, 50 g of prepurified propylene was added under stirring. The reactor mixture was heated to 85° C. At this reactor temperature premixed and sufficiently aged, 1 ml dimethylsilyl-bis(2-methyl-indenyl)zirconium dichloride dissolved in 1 ml toluene (1 mg/1 ml) and 1 ml solution of 10 wt. % methylaluminoxane in toluene were placed in the reactor. The polymerization was conducted for 30 minutes. Thereafter, the reactor was cooled down and vented to the atmosphere. The product, which was soluble in hexane, was precipitated in slightly acidified isopropanol. Thereafter, the product was washed, filtered and dried under reduced pressure for 24 hr. The yield was 51.5 g.

The composition was determined by NMR 90.7% mole propylene 9.3% mole 1-butene). The molecular weights and molecular weight distribution from GPC data were: Mn=24 k, Mw=59 k, Mz=136 k, Mw/Mn=2.5.

The DSC showed melting peak at 110° C. and crystallization peak at 70° C. and Tg at −8° C.

Example 10

400 ml of purified and degassed hexane was transferred into a stainless steel autoclave reactor with internal capacity of 1000 ml. The reactor had been maintained under slightly positive argon atmosphere at all times. Consequently, 1.5 ml solution of 10% wt. methylaluminoxane in toluene was transferred into the autoclave. 30 ml of purified 1-butene was added and the mixture was stirred until stable pressure. The reactor was maintained at a slightly positive pressure. In succession, 50 g of prepurified propylene was added under stirring. The reactor mixture was heated to 85° C. At this reactor temperature premixed and sufficiently aged, 0.2 ml dimethylsilyl-bis(2-methyl-4-phenylindenyl)zirconium dichloride dissolved in 1 ml toluene (1 mg/1 ml) and 0.5 ml solution of 10 wt. % methylaluminoxane in toluene were placed in the reactor. The polymerization was conducted for 15 minutes. Threafter, the reactor was cooled down and vented to the atmosphere. The product, which was soluble in hexane, was precipitated in slightly acidified isopropanol. Thereafter, the product was washed, filtered and dried under reduced pressure for 24 hr. The yield was 21.5 g.

The composition was determined by NMR 81.4% mole propylene/18.6% mole 1-butene). The molecular weights and molecular weight distribution from GPC data were: Mn=88 k, Mw=190 k, Mz=318 k, Mw/Mn=2.16.

The DSC showed melting peak at 105° C. crystallization peak at 63° C. The crystallinity was 24% and the Tg was −9° C.

Example 11

400 ml of purified and degassed hexane was transferred into a stainless steel autoclave reactor with internal capacity of 1000 ml. The reactor had been maintained under slightly positive argon atmosphere at all times. Consequently, 1.5 ml solution of 10% wt. methylaluminoxane in toluene was transferred into the autoclave. 40 ml of purified 1-butene was added and the mixture was stirred until stable pressure. The reactor was maintained at a slightly positive pressure. In succession, 50 g of prepurified propylene was added under stirring. The reactor mixture was heated to 85° C. At this reactor temperature premixed and sufficiently aged, 0.2 ml dimethylsilyl-bis(2-methyl-4-phenylindenyl)zirconium dichloride dissolved in 1 ml toluene (1 mg/1 ml) and 0.5 ml solution of 10 wt. % methylaluminoxane in toluene were placed in the reactor. The polymerization was conducted for 15 minutes. Thereafter, the reactor was cooled down and vented to the atmosphere. The product, which was soluble in hexane, was precipitated in slightly acidified isopropanol. Thereafter, the product was washed, filtered and dried under reduced pressure for 24 hr. The yield was 40 g.

The composition was determined by NMR 71.4% mole propylene/23.1% mole octene). The molecular weights and molecular weight distribution from GPC data were: Mn=88 k, Mw=182 k, Mz=298 k, Mw/Mn=2.06.

The DSC showed melting peak at 96° C. crystallization peak at 52° C. The crystallinity was 22% and the Tg was −16° C.

Example 12

400 ml of purified and degassed hexane was transferred into a stainless steel autoclave reactor with internal capacity of 1000 ml. The reactor had been maintained under slightly positive argon atmosphere at all times. Consequently, 1.5 ml solution of 10% wt. methylaluminoxane in toluene was transferred into the autoclave. 60 ml of purified 1-butene was added and the mixture was stirred until stable pressure. The reactor was maintained at a slightly positive pressure. In succession, 50 g of prepurified propylene was added under stirring. The reactor mixture was heated to 95° C. At this reactor temperature premixed and sufficiently aged, 1 ml dimethylsilyl-bis(2-methyl-indenyl)zirconium dichloride dissolved in 1 ml toluene (1 mg/1 ml) and 1 ml solution of 10 wt. % methylaluminoxane in toluene and 2 ml of purified hexane were placed in the reactor. The polymerization was conducted for 15 minutes. Thereafter, the reactor was cooled down and vented to the atmosphere. The product, which was soluble in hexane, was precipitated in slightly acidified isopropanol. Thereafter, the product was washed, filtered and dried under reduced pressure for 24 hr. The yield was 56.6 g.

The composition was determined by NMR 67.3% mole propylene/26.7% mole 1-butene). The molecular weights and molecular weight distribution from GPC data were: Mn=19 k, Mw=40 k, Mz=70 k, Mw/Mn=2.22.

The DSC showed melting peak at 63° C. crystallization peak at 23° C. The crystallinity was 13% and the Tg was −21° C.

Table 1 summarizes the polymerisation conditions and polymer characteristics of the preceding Examples.

The Table 2 shows the 13C NMR results for the preceding Examples.

Table 3 provides data on the adhesive performance of selected polymers made as described above in IA application.

Given that the polymers of the invention can be utilized without the use of tackifiers it is likely that they can be applied by spraying. Continuous fiberization techniques involve the fast stretching of a hot melt filament extruded through a nozzle. Therefore, good flow-ability in the nozzle itself is required and the ability to maintain a continuous filament without break is needed. The polymers of the invention have a narrow molecular weight distribution, similar to the polymers already used in sprayable formulations such as triblock styrenic copolymers or metallocene catalyzed plastomers (EP-858489, WO-9715636). The elasticity in the molten state is reduced, therefore, the occurrence of undesirable high stresses in the stretched filament are avoided. In contrary to highly tackified systems, the substantial absence of low molecular weight species (i.e. tackifiers, plasticizers) in the current invention provides a further guarantee of the cohesion of the systems in the molten state, since nearly all molecules are long enough to entangle with each other. This will further delay the undesired cohesion break of the hot melt filament during spraying operations, thereby opening new avenues for even faster line speeds.

The polymers of the invention were also applied from a solvent solution with a minor amount of tackifier. An easy release performance was shown, which due to the absence of non-polymeric contaminants indicates suitability in applications where no residue may be left on the surface after tape removal, such as medical tape.

The polymers of the invention are also intended for use in adhesives, sealing, and coatings. They may be added as hot melts alone or with other components such as tackifiers, antioxidants, crystallinity modifiers, etc. They may added in a suitable solvent alone or with other components such as tackifiers, antioxidants, crystallinity modifiers, etc. and the solvent is evaporated after application on a substrate.

TABLE 1

| Example | TM | Co-catalyst | Al/Zr mol ratio | Mol % $C_3^=$ | Comonomer | Mw x[$10^3$] | Mw/Mn | Tm [° C.] | Tg [° C.] | Crystallinity X % |
|---|---|---|---|---|---|---|---|---|---|---|
| 1 | dimethylsilyl-bis(2-methyl-4-phenylindenyl)zirconium dichloride | MAO | 1000 | 73 | Hexene | 93 | 2.0 | 41 | −23 | 6.7 |
| 2 | dimethylsilyl-bis(2-methyl-4-phenylindenyl)zirconium dichloride | MAO | 1000 | 75 | Hexene | 99 | 2.2 | 43 | −21 | 7.0 |
| 3 | dimethylsilyl-bis(2-methyl-4-phenylindenyl)zirconium dichloride | MAO | 2000 | 92 | Hexene | 25 | 2.2 | 95 | −6 | 18 |
| 4 | dimethylsilyl-bis(2-methyl-indenyl)zirconium dichloride | MAO | 800 | 79 | Hexene | 28 | 2.0 | 45 | −22 | 10 |
| 5 | dimethylsilyl-bis(2-methyl-indenyl)zirconium dichloride | MAO | 800 | 74 | Hexene | 108 | 1.9 | 42 | −23 | 11 |
| 6 | dimethylsilyl-bis(2-methyl-4-phenylindenyl)zirconium dichloride | MAO | 2000 | 90 | Hexene | 105 | 1.9 | 86 | −8 | 15 |
| 7 | dimethylsilyl-bis(2-methyl-indenyl)zirconium dichloride | MAO | 1000 | 94 | Hexene | 96 | 2.3 | 94 | −12 | 18 |
| 8 | dimethylsilyl-bis(2-methyl-indenyl)zirconium dichloride | MAO | 1000 | 93 | Octene | 50 | 2.2 | 94 | −17 | 20 |
| 9 | dimethylsilyl-bis(2-methyl-indenyl)zirconium dichloride | MAO | 800 | 90.7 | Butene | 59 | 2.5 | 110 | −8 | 25 |
| 10 | dimethylsilyl-bis(2-methyl-4-phenylindenyl)zirconium dichloride | MAO | 5000 | 81.4 | Butene | 190 | 2.2 | 105 | −9 | 23 |
| 11 | dimethylsilyl-bis(2-methyl-4-phenylindenyl)zirconium dichloride | MAO | 5000 | 71.4 | Butene | 180 | 2.1 | 96 | −16 | 21 |
| 12 | dimethylsilyl-bis(2-methyl-indenyl)zirconium dichloride | MAO | 800 | 67.3 | Butene | 40 | 2.2 | 63 | −21 | 13 |

TABLE 2

| example | Mole fraction of PP diads (experimental) | Mole fraction of PP diads (Bernullian, calculated) | PP diad (exp.)/PP diad (calc.) | Reactivity ratios $R_A \times R_B$ |
|---|---|---|---|---|
| Rextac | 0.488 | 0.454 | 1.075 | 1.35 |
| 1 | 0.537 | 0.543 | 0.989 | 0.92 |
| 2 | 0.540 | 0.543 | 0.995 | 0.93 |
| 3 | 0.846 | .847 | 0.999 | 0.85 |
| 4 | 0.632 | 0.627 | 1.008 | 1.18 |
| 5 | 0.551 | 0.546 | 1.009 | 1.14 |
| 6 | 0.828 | 0.829 | 0.999 | 0.85 |
| 7 | 0.877 | 0.876 | 1.001 | 1.13 |
| 8 | 0.870 | 0.869 | 1.001 | 1.12 |
| 9 | 0.823 | 0.823 | 1.000 | 1.06 |
| 10 | 0.659 | 0.662 | 0.995 | 0.87 |
| 11 | 0.586 | 0.5912 | 1.009 | 0.85 |
| 12 | 0.538 | 0.537 | 1.002 | 1.04 |

TABLE 3

| HMA Evaluation-Polymer applied neat at. 150° C. | Rextac RT 2715 Neat Polymer | 5 | 1 | 2 |
|---|---|---|---|---|
| Viscosity at 180° C. (mPas) (Brookfield As 8./Spindle 21) | 2280 | 14800 | 1920 | 3030 |
| Softening Point (° C.) (Average of 2 Samples) (Herzog As 1.) | 109.5<br>109.3/109.06 | 72.5<br>72.3/75.6 | 75<br>74.7/75.9 | 72.5<br>73.7/72.4 |
| Coating. (° C.) (Acumeter As 1.) | 150 | 150 | 150 | 150 |
| Press Lamination at . . . (° C.) (PHI Press. 4400 Psi for 30 s.) | 110 (PE)/150 (AL & PP) | 110 (PE)/150 (AL & PP) | 110 (PE)/150 (AL & PP) | 110 (PE)/150 (AL & PP) |
| T - Peel at Roomtemp. on PE. G/cm) (Average of 3 Samples.) | 478<br>Adhesion Failure.<br>410/400/380 | 455<br>Adhesion Failure.<br>450/375/540 | 480<br>Adhesion Failure. | 375<br>Adhesion Failure. |
| T - Peel at Roomtemp. on Al. G/cm) (Average of 3 Samples.) | 397<br>Adhesion Failure.<br>410/400/380 | 432<br>Adhesion Failure.<br>430/450/415 | 387<br>Adhesion Failure. | 302<br>Adhesion Failure. |
| T - Peel at Roomtemp. on PP. G/cm) (Average of 3 Samples.) | 498<br>Adhesion Failure.<br>410/400/380 | 542<br>Adhesion Failure.<br>450/375/540 | 400<br>Adhesion Failure. | 370<br>Adhesion Failure. |
| Hot Shear. (Min) (1" × ½" × 1 Kg./ Average of 3 Samples.) | 25<br>25/28/21 | 5<br>5/6/5 | 26<br>31/29/19 | 28<br>23/29/33 |
| S.A.F.T.(° C.) (1" × ½" × 0.5 Kg./ Average of 3 Samples.) | 52<br>51.3/52.9/51.8 | 42<br>42.2/42.8/41.7 | 48.5<br>49.2/46.5/49.7 | 42<br>41.7/42.8/42.2 |
| Static Shear at 60° C. (Min.) (1" × ½" × 1 Kg./ Average of 3 Samples.) | 4.5<br>4/5/4 | 1<br>1/1/1 | 3<br>4/3/2 | 1<br>1/1/1 |

What is claim is:

1. A poly-alpha olefin interpolymer comprising components:

(A) from 60 to 94 mol % of units derived from one alpha mono-olefin having from 3 to 6 carbon atoms;

(B) from 6 to 40 mol % of units derived from one or more other mono-olefins having from 4 to 10 carbon atoms and at least one carbon atom more than (A); and (C) optionally from 0 to 10 mol % of units derived from another copolymerizable unsaturated hydrocarbon, different from components (A) and (B);

wherein
(i) the diad distribution of component (A) in the interpolymer as determined by $^{13}C$ NMR divided by the calculated Bernoullian diad distribution is less than 1.07; and
(ii) the storage modulus G' of the interpolymer determined on cooling, measured at 1 Hz, intersects $3 \times 10^5$ Pa at an intersection temperature of less than 85° C.

2. The interpolymer of claim 1, wherein the interpolymer has a melting behavior as determined by DSC such that $T_m$ (interpolymer) is less than $153-2.78 \times [C_{B+C}]$ for any given concentration of (B) and (C) components, wherein $T_m$ is the major melting peak of the interpolymer at a given content of components (B) and (C) in mole percent, and $[C_{B+C}]$ is the mole percent of component (B) plus the mole percent of component (C).

3. A poly-alpha olefin interpolymer having:
(A) from 60 to 94 mol % of units derived from one alpha mono-olefin having from 3 to 6 carbon atoms;

(B) from 6 to 40 mol % of units derived from one or more other mono-olefins having from 4 to 10 carbon atoms and at least one carbon atom more than (A); and (C) optionally from 0 to 10 mol % of units derived from another copolymerizable unsaturated hydrocarbon, different from components (A) and (B);

wherein
(i) the diad distribution of component (A) in the interpolymer as determined by $^{13}C$ NMR divided by the calculated Bernoullian diad distribution is less than 1.07; and
(ii) the interpolymer has a melting behavior as determined by DSC such that $T_m$ (interpolymer) is less than 153–

$2.78 \times [C_{B+C}]$ for any given concentration of (B) and (C) components, where $T_m$ is the major melting peak of the interpolymer at a given content of components (B) and (C) in mole percent, and $[C_{B+C}]$ is the mole percent of component (B) plus the mole percent of component (C).

4. The interpolymer of claim 3, wherein the interpolymer has a storage modulus G' determined on cooling, measured at 1 Hz, intersecting $3 \times 10^5$ Pa at an intersection temperature of less than 85° C.

5. The interpolymer of claim 1, 2, or 3, wherein the content of (B) combined with (C) is 8 to 40 mol %, and wherein the intersection temperature is less than 70° C.

6. The interpolymer of claim 1 or 3, wherein the interpolymer has a reactivity ratio $R_A \times R_B$ as determined by NMR of less than 1.4, wherein $R_A$ is the reactivity ratio of component (A) over component (B), and $R_B$ is the ratio of component (B) over component (A).

7. The interpolymer of claim 1 or 3, wherein (A) is derived from units having from 3 to 6 carbon atoms; (B) is derived from units having from 4 to 8 carbon atoms; and (C) is derived from ethylene.

8. The interpolymer of claim 1 or 3, wherein the interpolymer has a melting peak as determined by DSC of at least 40° C.

9. The interpolymer of claim 1 or 4, wherein G' at 120° C. is not greater than 1000 Pa.

10. The interpolymer of claim 1 or 3, wherein the interpolymer has an Mw/Mn as determined by GPC of 1.5 to 4.

11. The interpolymer of claim 1 or 4, wherein the weight average molecular weight of the interpolymer as determined by GPC is 20,000–120,000, and the intersection temperature is less than 70° C.

12. The interpolymer of claim 11, wherein the weight average molecular weight is 30,000–120,000.

13. The interpolymer of claim 11, wherein the weight average molecular weight is 30,000–90,000.

14. The interpolymer of claim 13, wherein the weight average molecular weight is 40,000–70,000.

15. The interpolymer of claim 7, wherein (A) is derived from propylene.

16. The interpolymer of claim 7, wherein (B) is derived from units having two more carbon atoms than the units of (A).

17. The interpolymer of claim 16, wherein the units of (B) are selected from butene-1, hexene-1 and octene-1.

18. The interpolymer of claim 7, wherein (A) is derived from propylene; (B) is derived from units having 5–8 carbon atoms; and (C) is derived from ethylene.

19. The interpolymer of claim 1 or 3, comprising 65–94 mol % of units derived from (A); 6–30 mol % of units derived from (B); and 0–5 mol % of units derived from (C).

20. The interpolymer of claim 19, comprising 75–90 mol % of units derived from (A) and 10–25 mol % of units derived from (B).

21. The interpolymer of claim 19, comprising 0–2 mol % of units derived from (C).

22. The interpolymer of claim 21, comprising 75–90 mol % of units derived from (A) and 10–25 mol % of units derived from (B).

23. The interpolymer of claim 1 or 3, wherein the interpolymer has a heat of fusion of 5–40 J/g as determined by DSC.

24. The interpolymer of claim 23, wherein the heat of fusion is 5–30 J/g.

25. The interpolymer of claim 23, wherein the heat of fusion is 10–30 J/g.

26. The interpolymer of claim 25, wherein the heat of fusion is 10–20 J/g.

27. The interpolymer of claim 1 or 3, wherein the interpolymer has a melting point as determined by DSC of 130° C. or less.

28. The interpolymer of claim 26, wherein the melting point is 95° C. or less.

29. The interpolymer of claim 8, wherein the interpolymer has a melting peak as determined by DSC of 50° C. or less.

30. The interpolymer of claim 1 or 3, wherein the interpolymer has a Tg determined by DSC of minus 40° C. to minus 5° C.

31. The interpolymer of claim 30, wherein the Tg is minus 40° C. to minus 20° C.

32. The interpolymer of claim 30, wherein the Tg is minus 30° C. to minus 20° C.

33. The interpolymer of claim 9, wherein G' at 120° C. is not greater than 500 Pa.

34. The interpolymer of claim 33, wherein G' at 120° C. is not greater than 100 Pa.

35. The interpolymer of claim 10, wherein Mw/Mn is 1.5 to 3.

36. The interpolymer of claim 10, wherein Mw/Mn is 1.6 to 2.2.

37. The interpolymer of claim 30, wherein Tg is minus 30° C. to minus 15° C.

38. The interpolymer of claim 27, wherein the melting point is 90° C. or less.

39. The interpolymer of claim 11, wherein the weight average molecular weight is 40,000–120,000.

40. The interpolymer of claim 11, wherein the weight average molecular weight is 20,000–90,000.

41. The interpolymer of claim 11, wherein the weight average molecular weight is 40,000–90,000.

42. The interpolymer of claims 11, wherein the weight average molecular weight is 20,000–70,000.

43. The interpolymer of claim 11, wherein the weight average molecular weight is 30,000–70,000.

44. The interpolymer of claim 23, wherein the heat of fusion is 5–20 J/g.

45. The interpolymer of claim 23, wherein the heat of fusion of 10–40 J/g.

46. The interpolymer of claim 10, wherein the Mw/Mn is 1.5 to 2.2.

47. The interpolymer of claim 10, wherein the Mw/Mn is 1.6 to 4.

48. The interpolymer of claim 10, wherein the Mw/Mn is 1.6 to 3.

* * * * *